(12) United States Patent
Lienert et al.

(10) Patent No.: US 9,056,927 B2
(45) Date of Patent: Jun. 16, 2015

(54) REACTIVE SYSTEMS

(75) Inventors: Klaus-Wilhelm Lienert, Hamburg (DE); Sabine Voedisch, Hamburg (DE); Majdi Al-Masri, Buchholz (DE); Michael Berkei, Haltern am See (DE); Janin Tecklenburg, Oberhausen (DE); Thomas Sawitowski, Wesel (DE)

(73) Assignee: ELANTAS GMBH, Wesel (DE)

( * ) Notice: Subject to any disclaimer, the term of this patent is extended or adjusted under 35 U.S.C. 154(b) by 218 days.

(21) Appl. No.: 13/383,529

(22) PCT Filed: Jul. 6, 2010

(86) PCT No.: PCT/EP2010/059650
§ 371 (c)(1),
(2), (4) Date: Apr. 10, 2012

(87) PCT Pub. No.: WO2011/006798
PCT Pub. Date: Jan. 20, 2011

(65) Prior Publication Data
US 2012/0190787 A1    Jul. 26, 2012

(30) Foreign Application Priority Data

Jul. 16, 2009 (DE) .......................... 10 2009 026 185

(51) Int. Cl.
*C08F 4/00* (2006.01)
*C08F 2/46* (2006.01)
*C08F 2/54* (2006.01)
*C08F 290/06* (2006.01)

(52) U.S. Cl.
CPC ... *C08F 2/54* (2013.01); *C08F 4/00* (2013.01); *C08F 2/46* (2013.01); *C08F 290/061* (2013.01)

(58) Field of Classification Search
CPC ...... C08F 290/061; C08F 212/08; C08F 2/46; C08F 2/54; C08F 4/00
USPC .......................................................... 502/100
See application file for complete search history.

(56) References Cited

U.S. PATENT DOCUMENTS

| 4,232,141 | A | | 11/1980 | Koyanagi et al. |
| 4,376,719 | A | * | 3/1983 | Goodman et al. ............ 502/159 |
| 4,675,426 | A | * | 6/1987 | Crivello ........................ 556/464 |
| 2002/0082314 | A1 | * | 6/2002 | Blum et al. ................... 522/111 |
| 2004/0059050 | A1 | | 3/2004 | Hilger et al. |
| 2005/0009992 | A1 | * | 1/2005 | Voorheis ....................... 525/244 |
| 2007/0059526 | A1 | * | 3/2007 | Lienert et al. .............. 428/402.2 |
| 2012/0190787 | A1 | * | 7/2012 | Lienert et al. ................. 524/539 |
| 2012/0329967 | A1 | * | 12/2012 | Murray et al. ................ 526/195 |
| 2013/0190467 | A1 | * | 7/2013 | Murray et al. ................ 526/170 |

FOREIGN PATENT DOCUMENTS

| DE | 2632294 A1 | 1/1978 |
| DE | 10058860 A1 | 6/2002 |
| GB | 1138793 A | 1/1969 |

OTHER PUBLICATIONS

Roempp Chemie Lexikon, 1991, p. 3297.
Heinrich Wolfers et al "Die Makromolekulare Chemie", 1979 180, 3, pp. 649-655.
Roempp Chemie Lexikon, 9. Auflage, Thieme Verlag, headwords "Aktivatoren" (p. 81), "Initiatoren" (pp. 1985, 1986), "Katalysatoren" (pp. 2169, 2170) and "Monomere" (p. 2847).
Roempp Lexikon Lacke und Druckfarben, 1998, Thieme Verlag, headword "Reaktivverduenner", pp. 491, 492.

* cited by examiner

*Primary Examiner* — Mark Eashoo
*Assistant Examiner* — Michael A Salvitti
(74) *Attorney, Agent, or Firm* — Abel Law Group, LLP

(57) ABSTRACT

Reactive system comprising at least one component (I) composed of particles in very finely divided form present in a liquid phase of at least one further component (II) with which component (I) is capable of reacting following activation through energy supply, wherein component (I) is not soluble in component (II), process for preparation and use.

20 Claims, No Drawings

REACTIVE SYSTEMS

All the documents cited in the present application are incorporated by reference in their entirety.

BACKGROUND OF THE INVENTION

1. Field of the Invention

The present invention relates to disperse systems activatable via energy supply, and also to an environmentally friendly preparation having a low hazard potential and to processes for production thereof. The present invention likewise relates to the use as, for example, polymerisation initiator, hardener and crosslinker in the plastics industry, and also to a process for controlled reaction management.

2. Discussion of Background Information

Peroxides are used as polymerisation initiators in the plastics industry and also as hardeners and crosslinkers in many applications (Rompp Chemie Lexikon, 1991, p. 3297). Peroxides cleave at elevated temperature to form free radicals which start the polymerisation of C—C double bonds in acrylates, methacrylates, styrene, vinyltoluene, and also copolymerisations, for example between the maleic or fumaric acid double bond with styrene. Cobalt(II) salts act as accelerants and catalyse the disintegration. Organic peroxides contain one or more peroxide groups —O—O—. This bond is not stable, disintegrates exothermically and gives off 180-350 kJ/mol of heat, leading to an (adiabatic) temperature increase of 400° C.-800° C. As a result, the handling of peroxides is not without its risks. Owing to the substantial potential risk, the legislator has put storage and transport under restrictive controls. Details are discernible from the particular applicable regulations. DE 2 632 294 describes the synthesis of various benzopinacol silyl ethers and their use as polymerisation initiators. These compounds act like peroxides, but do not have the hazard potential of the latter. Their function as free-radical initiators is based on the homolytic cleavage of the extremely long tetraphenyl-substituted C—C single bond. In contradistinction to peroxides, the cleavage is endothermic and also, if no monomer is available as reaction partner, reversible. Benzopinacol silyl ethers are inconvenient to synthesise and hence costly. Benzopinacol itself can also be used as a free-radical initiator for the polymerisation of unsaturated polyester resins (Heinrich Wolfers et al. in "Die Makromolekulare Chemie", 1979 180, 3, pp. 649-655). However, benzopinacol is very sparingly soluble in the systems to be polymerised, and sediments. Homogeneous materials of construction are accordingly difficult to obtain. This was hitherto a bar to industrial application.

SUMMARY OF THE INVENTION

Problem

The present invention addresses the problem of providing systems or formulations that are free of the disadvantages of the prior art, and/or permit particularly safe handling.

The present invention further addresses the problem of developing a preparation which does not sediment and polymerises/crosslinks unsaturated systems under the influence of heat. In addition, they shall have a lower hazarding potential compared with peroxides. Formulations comprising this preparation shall have an improved pot life.

Solution

The problem is solved by a disperse reactive system wherein a component (I), in very finely divided form is present in a component (II) with which the component (I) is capable of reacting following activation through energy supply, wherein component (I) is not soluble in component (II), processes for preparing the compositions processes for reaction control and the corresponding uses.

DEFINITIONS OF TERMS

Herein all quantitative recitations are to be understood as weight recitations, unless otherwise stated.

Herein the term "room temperature" is to be understood as meaning a temperature of 23° C. Temperature recitations are in degrees Celsius (° C.), unless otherwise stated.

Unless otherwise stated, the recited reactions or process steps are carried out at standard pressure/atmospheric pressure, i.e. at 1013 mbar.

Actinic radiation is here and hereinbelow to be understood as meaning electromagnetic radiation, such as infrared, near infrared, visible light, UV radiation or x-rays, more particularly UV radiation, or corpuscular radiation, such as electron beam radiation. Inert solvents herein are those which do not react with the compounds that are to initiate/cure the reactive formulation according to the invention, i.e. which are not chemically incorporated in the resulting products, but remain physically removable. Reactive solvents, by contrast, are those which can be chemically incorporated in the resulting products.

The term (meth)acryloyl herein is to be understood as meaning not only methacryloyl but also acryloyl and mixtures thereof.

C—C labile compounds are herein to be understood as meaning compounds having easily cleaved C—C bonds, more particularly a C—C single bond having a) a length between 1.522 and 1.750 Angstrom (1 Angström=$10^{-10}$ m), b) a dissociation energy in the range from 50 to 369 kJ/mol, and which c) cleave homolytically at a temperature of 60 to 150° C. (at 1.013 bar).

Herein the terms "activator", "initiator", "catalyst" and "monomer" are to be understood as defined in Rompp Chemie Lexikon, 9th edition, Thieme Verlag, headwords "Aktivatoren" (page 81), "Initiatoren" (pages 1985, 1986), "Katalysatoren" (pages 2169, 2170) and "Monomere" (page 2847).

The term "monomers" herein also comprises "reactive diluents" as defined in Rompp Lexikon Lacke and Druckfarben, 1998, Thieme Verlag, headword "Reactivverdünner", pages 491, 492.

Herein the terms "reactive system" and "reactive formulation" comprise, respectively, systems and formulations capable of chemical reaction following energy supply.

Activation through energy supply is to be understood as meaning that a higher thermal energy than room temperature is necessary, and/or that ambient radiation (light, UV, natural radioactivity, etc.) is not sufficient, but that energy has to be additionally supplied via actinic radiation.

Particle sizes herein, unless otherwise stated, are to be understood as particle sizes determined by acoustospectrometry, more particularly by means of a DT-1200 DT spectrometer from Quantachrome GmbH & Co. KG.

DETAILED DESCRIPTION

The invention provides a disperse reactive system wherein at least one component (I) containing or consisting of particles between 5 nm and 500 µm, preferably between 1 µm and 300 µm, in size, in very finely divided form is present in a liquid phase of at least one further component (II) with which component (I) is capable of reacting following activation through energy supply, wherein component (I) is not soluble in component (II).

The invention further provides a reactive formulation characterized by a very finely divided solid reactive component in a liquid component (dispersion). The finely divided solid reactive component is at least one compound having C—C labile bonds. This reactive formulation is an example of component (I) of the disperse reactive system.

The invention also provides a process for controlled reaction management, which process comprises preparing a disperse reactive system by very finely dividing
a) at least one component (I) which is activatable through energy supply and is composed of particles between 5 nm and 500 µm, preferably between 1 µm and 300 µm, in size in
b) a liquid phase of at least one further component (II) with which the component (I), activatable through energy supply, is capable of reacting following activation and in which it is not soluble.

The disperse reactive systems according to the invention are characterized in that
a) at least one component (I) containing or consisting of particles between 5 nm and 500 µm, preferably between 1 µm and 300 µm, in size, in very finely divided form
b) is present in a liquid phase of at least one further component (II) with which the particles of component (I) are capable of reacting following activation through energy supply,
c) wherein the particles of component (I) are not soluble in component (II).

Component (I) may preferably be selected from the group consisting of
initiators for chemical reactions, preferably chain-growth addition polymerisations, step-growth addition polymerisations, condensation polymerisations,
activators for chemical reactions,
catalysts for chemical reactions,
monomers for chain-growth addition polymerisations, step-growth addition polymerisations, condensation polymerisations
and mixtures thereof.

A person skilled in the art is well aware which initiators, activators, catalysts and/or monomers are suitable for the particular purpose; accordingly, they need not be detailed here. The only conditions are that they have to be present in component (II) as very finely divided particles and that they are not soluble in component (II).

Herein the term "not soluble" is preferably understood as meaning that the particles of component (I) dissolve in component (II) at not more than 1% by weight, preferably at not more than 0.1% by weight.

It is preferable when component (I) is selected from the group consisting of
initiators for chemical reactions, preferably chain-growth addition polymerisations, step-growth addition polymerisations, condensation polymerisations,
activators for chemical reactions,
catalysts for chemical reactions,
monomers for chain-growth addition polymerisations, step-growth addition polymerisations, condensation polymerisations,
and mixtures thereof, or the reactive formulation according to the invention.

The energy supply to the disperse reactive systems of the present invention is preferably effected through actinic radiation and/or thermal energy. However, in principle it is also possible to introduce the energy through mechanical energy.

Component (I) can be present from the start in a very finely divided state, i.e. in a size between 5 nm and 500 µm, preferably between 1 µm and 300 µm, or else be processed into particles between 5 nm and 500 µm, preferably between 1 µm and 300 µm, in size in the course of or after incorporation in component (II).

It is preferable to process component (I) into particles between 5 nm and 500 µm, preferably between 1 µm and 300 µm, in size only in the course of or after incorporation in component (II), since aggregation or sedimentation of component (I) is in this way avoided. When the processing to particles between 5 nm and 500 µm, preferably between 1 µm and 300 µm, in size is effected by grinding or similar processes in the presence of component (II), the resulting heat (of friction) is also removed in this way, and so there is no premature reaction or unwanted side-reactions.

Component (II) of the reactive system according to the invention is preferably selected from the group consisting of
(i) at least one polymer,
(ii) one or more monomers or monomer mixtures, or
(iii) a mixture of monomer(s) and polymer(s).

In the event that both component (I) and component (II) constitute or contain monomers, the monomers of component (I) are nonetheless subject to the conditions mentioned: the monomers of component (I) must not dissolve in the monomers of component (II) and have a size between 5 nm and 500 µm, preferably between 1 µm and 300 µm.

In one version of the present invention, component (II) may, in addition to (i), (ii) and (iii), contain at least one solvent with the proviso that the solvent does not dissolve the particles of component (I).

Useful solvents for this purpose accordingly depend on which component (I) is used; they may very easily be selected by a person skilled in the art on the basis of his or her general knowledge, or if a person skilled in the art is not certain whether the desired solvent does or does not dissolve the particles of component (I), this can be determined by means of very simple preliminary tests.

In one version of the present invention, accordingly, component (II) can consist of a mixture of monomer(s), polymer(s) and/or solvent(s) which does not dissolve the particles of component (I).

The reactive systems according to the invention are prepared by processes in which component (I) and component (II) are mixed with each other wherein the particles of component (I) are prepared either before the mixing, in the course of the mixing or after the mixing with component (II), preferably by grinding.

The fine dispersion of component (I) in component (II) makes it possible for the reaction of the ingredients to take place very rapidly and uniformly on activation. The disadvantages of the prior art, for example the Trommsdorff-Norrish effect, are avoided.

The reactive systems according to the invention also make it possible to omit toxic solvents for certain ingredients, since herein they can be replaced by less toxic solvents which normally could not be used as solvents because they are unable to dissolve component (II).

One version of the present invention utilises as component (I) the reactive formulation according to the invention, as described hereinbelow.

In the process according to the invention for preparing the reactive formulation, crystals of at least one compound having preferably C—C labile bonds are ground to extremely fine particles. These particles can be dispersed in various monomers, unsaturated resins and complex unsaturated formulations without cloudiness or sedimentation.

The invention also comprises preparations consisting of compounds to be reacted with each other and the reactive formulation according to the invention, and so at least one reaction partner (preferably compound(s) containing C—C labile bonds) is present as a finely dispersed solid.

In these preparations, the chemical reaction is started through thermal or else other activation, preferably through thermal activation, of the dispersed solid. These preparations are examples of reactive systems according to the invention.

The reactive formulation according to the invention is very useful for polymerising, curing and/or crosslinking polymerisable compositions.

The reactive formulation according to the invention can be used as a polymerisation initiator, as a hardener and/or crosslinker, more particularly in the plastics industry.

The reactive formulation according to the invention may preferably consist of
component (A) consisting of at least one compound having at least one C—C labile bond,
component (B) consisting of a solvent or solvent mixture in which component (A) is not soluble,
optionally component (C) consisting of one or more dispersing assistants for component (A),
in which case compound (A) is present as a dispersed solid having a particle size between 5 nm and 500 µm, preferably between 1 µm and 300 µm.

Herein the term "not soluble" is preferably understood as meaning that component (A) dissolves in component (B) at not more than 1% by weight, preferably at not more than 0.1% by weight.

It is an essential feature of the present invention that the extremely fine form of component (A) makes them easy to disperse and then able to combine with components (B) and optionally (C) to form a stable dispersion.

Component (A) consists of a compound having a labile C—C bond which is cleaved under the influence of heat or actinic radiation, more particularly heat.

Compounds useful according to the invention are compounds of the general formula

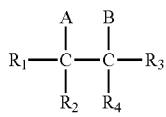

where the variables each independently have the following meanings:
$R_1$ and $R_3$ aromatic radicals which may be substituted by $C_1$-$C_6$ alkyl radicals and/or halogen from one to five times, preferably phenyl, methyl, tert-butyl,
$R_2$ and $R_4$ hydrogen, aromatic radicals which may be substituted by $C_1$-$C_6$ alkyl radicals and/or halogen from one to five times, or aliphatic radicals, preferably phenyl or hydrogen,
A and B hydroxyl, $C_1$-$C_4$ alkoxy and/or halogen, preferably hydroxyl or methyl, preferably highly substituted ethane derivatives, more particularly 1,1,2,2-tetraphenylethanediol (benzopinacol), benzopinacols substituted on the benzene nuclei, 1,2-di-tert-butylethanediol and its derivatives, 2,3-dimethyl-2,3-diphenylbutane, and poly-1,4-diisopropylbenzene.

Further examples of highly substituted ethane derivatives which can be used according to the invention are p,p'-dimethylbenzopinacol, p,p'-diphenylbenzopinacol, 1,2-dihydroxy-1,2-dimethyl-1,2-diphenylethane, 1,2-methoxytetraphenylethane.

Benzopinacol is most preferred for component (A) in the context of the present invention.

Particular preference according to the invention is given to compounds which are subject to a homolytic cleavage of bond at temperatures between 80 and 150° C., more particularly between 100 and 130° C.

Component (B) is a solvent or solvent mixture. The condition is that component (A) is not soluble therein. The solvent or solvent mixture can be inert or else reactive and contain C—C double bonds.

Useful solvents include various aromatics-containing distillation cuts, for example Solvesso 100, Solvesso 150, or else aromatics-free hydrocarbyl mixtures, for example Shellsol D25, Shellsol D40. It is likewise possible to use solvents based on esters and ethers. Useful reactive solvents include styrene, vinyltoluene, butyl acrylate, butyl methacrylate.

Furthermore, a person skilled in the art will be perfectly aware which reactive solvents (also known as reactive diluents) he or she will have to choose for the particular reaction mixture to be initiated or cured; if necessary, he or she is able to do this by consulting pertinent technical literature, for example Rompp Lexikon "Lacke and Druckfarben", headword "Reaktivverdünner".

Preference is given to using Solvesso 100, Solvesso 150, Shellsol D25, Shellsol D40. Solvesso 100 is particularly preferred according to the invention.

Component (C), if used, consists of one or more dispersing assistants to disperse component (A) or facilitate the dispersing of component (A), and stabilise the resulting dispersion. Additives useful as dispersing assistants will be known to a person skilled in the art and their use comprises part of the state of the art.

In one version of the present invention, dispersing assistants used can be selected from salts of polymers having acidic groups (e.g. Disperbyk® 106), low molecular weight polyacrylate salts or salts of other polycarboxylic acids, phosphoric ester salts of high molecular weight copolymers having groups with pigment affinity (e.g. Disperbyk® 145), high molecular weight block copolymers having groups with pigment affinity (e.g. Disperbyk® 2163, Disperbyk® 2164). Reference is further made to the literature of the various manufacturers of dispersing assistants.

It is possible herein to use various solvents in any desired admixture. One variant is to mix reactive solvents with inert solvents.

The reactive formulation according to the invention is preferably prepared by the process according to the invention wherein
a) the three components are mixed and then
b) ground to obtain a dispersion in which component (A) is present in a particle size between 5 nm and 500 µm, preferably between 1 µm and 300 µm.

Herein component (A) is preferably ground using mills, but any other grinding tool known to be suitable to a person skilled in the art can also be used.

The reactive formulation according to the invention is preferably prepared from
30-50% by weight, preferably 35-45% by weight, more preferably 38-42% by weight of C—C labile compound (component (A)),
25-70% by weight, preferably 35-60% by weight, more preferably 40-50% by weight of solvent or solvent mixture (component (B)), 0-25% by weight, preferably 5-20% by weight, more preferably 10-18% by weight of one or more dispersing assistants (component (C)).

The reactive formulation according to the invention is processed by the method customary in the art whereby it is mixed with polymerisable or curable components and the mixture is reacted at elevated temperature and/or by application of actinic radiation.

Since the reactive formulation according to the invention and also the reactive systems according to the invention comprise microscopically heterogeneous systems, the Arrhenius equation has no traction and the formulated products have improved stability in storage compared with conventional formulations containing 1% of peroxide for example.

Incorporation or inclusion of the reactive formulations according to the invention in curable compositions gives compositions which are safe to handle, which have excellent stability in storage yet which nonetheless cure rapidly and uniformly on heating.

The reactive formulations according to the invention also make it possible to omit toxic solvents for certain ingredients, since herein they can be replaced by less toxic solvents which normally would not be used as solvents because they are unable to dissolve component (A).

The reactive formulation according to the invention is preferably incorporated in compositions whose crosslinking or curing reaction is based on the reaction of olefinically unsaturated double bonds, for example compositions containing vinyl or (meth)acrylate (groups), or compositions containing unsaturated polyesters.

It is very particularly preferred to incorporate the reactive formulation according to the invention in compositions containing unsaturated polyesters.

The reactive formulation according to the invention is also useful as a polymerisation initiator for preparing simple, i.e. uncrosslinked, polymers.

The reactive formulation according to the invention can be used in the plastics industry and/or in the electrical engineering industry for curing or crosslinking polymerisable compositions, preferably impregnating and casting resins.

The present invention accordingly also provides compositions containing the reactive formulation according to the invention and polymerisable or curable compounds.

The reactive formulation according to the invention is a universally useful supplier of free radicals.

The disperse reactive system according to the invention may in a further embodification contain one or more auxiliaries of the kind customary for the particular application, for example paint auxiliaries or the like.

It is possible to render the disperse systems of the present invention latently reactive by adding additional stabilising constituents, i.e. the systems are activated by energy supply and are then still (meta)stable for a certain period owing to the stabilising additive, notwithstanding the activation. In this embodiment, the systems can then be added to a further component which then reacts with these (in the form of multicomponent systems).

The principle of the present invention is that inherently insoluble compounds which can be activated by energy supply are dispersely divided to form reactive systems which are nonetheless stable under normal conditions (23° C., 1013 mbar pressure, ambient light). These systems are visually homogeneous to the normal/macroscopic observer, but heterogeneous under the microscope.

That this works very well and with a wide variety of systems is surprising and was first discovered in the context of the present invention.

It is surprising that the present invention is able to provide reactive systems and reactive formulations having the advantages mentioned, i.e. are inter alia stable in storage, realisable in an environmentally friendly manner, easy to produce, and yet provide excellent reaction results or to be more precise products.

The particle distributions of the insoluble components (I) and (A) can be mono-, bi- or polymodal, preferably mono- or bimodal, in the context of the present invention.

In one version of the present invention, component (A) may have a particle size of between 5 nm and 500 µm, preferably between 1 µm and 300 µm, and a bimodal particle distribution having maxima at about 10 µm and about 200 µm.

The reactive systems according to the invention have universal utility. Particularly for chain-growth addition polymerisations, curable systems, catalytic reactions. It can also be used for polymer-analogous reactions, chemical staged reactions or to be more precise elementary, i.e. non-polymerising, reactions.

The various embodiments of the present invention, for example those of the various dependent claims, can be combined with each other in any desired manner.

The invention will now be more particularly described with reference to the following non-limiting examples:

Example 1

Preparation of a Dispersion 1 of Benzopinacol

A 100 mL wide-neck glass bottle had 23 g of Solvesso 100 weighed into it. While stirring at low speeds using a Dispermat 7 g of Disperbyk® 106 were metered in as dispersing additive and stirred in until the additive had completely dissolved. Then, 20 g of benzopinacol were likewise slowly added with stirring and stirred in until a homogeneous mass had formed. Then, 80 g of glass beads of 1 mm diameter were added and the glass bottle was twisted shut. Dispersing took place in a shaker (model: Disperser DAS H 200-K from Lau GmbH). After dispersing, the glass beads were filtered off on a 240 µm high-speed sieve and the dispersion was stored in glass bottles.

Example 2

Preparation of a Dispersion 2 of Benzopinacol

Example 1 was repeated with the following composition: 16.7 g of Solvesso 100.6 g of Disperbyk® 145 and 20 g of benzopinacol.

Example 3

Preparation of a Dispersion 3 of Benzopinacol

Example 1 was repeated with the following composition: 24 g of Solvesso 100, 13.3 g of a solution of Disperbyk® 2163 (45% strength in butyl acetate/methoxypropyl acetate) and 20 g of benzopinacol.

Example 4

Preparation of a Dispersion 4 of Benzopinacol

Example 1 was repeated with the following composition: 20 g of Solvesso 100, 10 g of a solution of Disperbyk® 2164 (60% strength in butyl acetate/methoxypropyl acetate) and 20 g of benzopinacol.

Example 5

Preparation of a Curable Mixture 1

2.5 g of dispersion 1, 2.0 g of styrene and 97 g of Dobeckan® FT 1018 unsaturated styrene polyester based on maleic acid/neopentyl glycol (67% strength in styrene) were mixed. The result was a clear mixture having stability in storage. The gel time of the mixture, determined in a Geltimer from Gelnorm, at 100° C. was 11.8 minutes. Following a storage period of 1 month, gel time was 10.2 minutes.

Example 6

Preparation of a Curable Mixture 2

2.5 g of dispersion 2, 2.0 g of styrene and 97 g of Dobeckan® FT 1018 were mixed. The result was a clear mixture having stability in storage. The gel time of the mixture at 100° C. was 12.9 minutes. Following a storage period of 1 month, gel time was 10.8 minutes.

Example 7

Preparation of a Curable Mixture 3

2.5 g of dispersion 3, 2.0 g of styrene and 97 g of Dobeckan® FT 1018 were mixed. The result was a clear mixture having stability in storage. The gel time of the mixture at 100° C. was 12.5 minutes. Following a storage period of 1 month, gel time was 11.2 minutes.

Example 8

Preparation of a Curable Mixture 4

2.5 g of dispersion 4, 2.0 g of styrene and 97 g of Dobeckan® FT 1018 were mixed. The result was a clear mixture having stability in storage. The gel time of the mixture at 100° C. was 13.4 minutes. Following a storage period of 1 month, gel time was 11.0 minutes.

Example 9

Preparation of a Peroxide-Containing Curable Mixture 5 (Comparative Example 1)

1 g of tert-butyl perbenzoate, 2.0 g of styrene and 97 g of Dobeckan® FT 1018 were mixed. The result was a clear solution. The gel time of the solution at 100° C. was 22.5 minutes. After a storage period of 1 month, the gel time was 19.7 minutes.

Example 10

Preparation of a Benzopinacol Silyl Ether-Containing Curable Mixture 6 (Comparative Example 2)

1.4 g of a commercially available benzopinacol silyl ether, 2.0 g of styrene and 97 g of Dobeckan® FT 1018 were mixed. The result was a clear solution. The gel time of the solution at 100° C. was 5.6 minutes. After a storage period of 1 month, the gel time was 5.2 minutes.

Example 11

Preparation of Curable Mixtures 7a, 7b, 7c, 7d, 7e, 7f 1 g of dispersion 1 and 99 g of Sartomer® 9020 propoxylated glyceryl triacrylate were mixed. The result was a clear mixture having stability in storage. The gel time of the mixture at 100° C. was 8.5 minutes. After a storage period of 1 month, the gel time was 8.9 minutes (7a).

Using dispersions 2, 3 and 4 instead of dispersion 1 gave gel times of 9.9 minutes, 8.3 minutes and 7.8 minutes and, after 1 month, of 11.5 minutes, 9.8 minutes and 8.4 minutes (7b, 7c, 7d).

The comparative examples with, on the one hand, 1 g of tert-butyl perbenzoate (7e) and on the other 1.4 g of commercially available benzopinacol silyl ether (7f) in 99 g of acrylate gave gel times of 14.1 and 3.4 minutes and after one month of 14.2 and 3.5 minutes.

Example 12

Formulations of the Dispersions and also of the Peroxide and of the Benzopinacol Silyl Ether with Triethylene Glycol Divinyl Ether In each case, 2.5 g of dispersions 1, 2, 3 and 4 were mixed with 99 g of triethylene glycol divinyl ether each. Clear mixtures were obtained that were impossible to cure. No measurable gel time was obtained.

Mixtures of on the one hand 1 g of tert-butyl perbenzoate and on the other hand 1.4 g of a commercially available benzopinacol silyl ether with 99 g of triethylene glycol divinyl ether likewise did not give any curable mixtures. In no case did a free-radical homopolymerisation take place.

Example 13

Storage of Mixtures 1 to 6 at 50° C.

Mixtures 1 to 6 were stored in a sealed vessel in a customary circulating-air thermal cabinet at 50° C. Mixture 6 with the benzopinacol silyl ether had gelled after 3 days. Mixture 5 with the tert-butyl perbenzoate gelled after 6 days.

Mixtures 1 to 4 were unchanged even after 15 days.

An increase in the viscosity of the formulation comprising very finely divided compound having C—C labile bonds is not observed in the tests.

By contrast, the peroxide-containing formulations all display an increase in viscosity due to a room temperature decomposition of peroxide and ensuing polymerisation.

The benzopinacol silyl ethers behave similarly to the peroxides in that they are soluble in the matrix like the peroxides.

What is claimed is:
1. A reactive formulation, wherein the formulation consists of (A) at least one compound having at least one C—C-labile bond, (B) a solvent or solvent mixture in which (A) is not soluble and which comprises one or more solvents selected from aromatics-containing distillation cuts, aromatics-free hydrocarbyl mixtures, esters, ethers, styrene, vinyltoluene, butyl acrylate, butyl methacrylate, and combinations thereof and, optionally, (C) one or more dispersants for (A), (A) being present in (B) as a dispersed solid having a particle size of from 5 nm to 500 μm.

2. The reactive formulation of claim 1, wherein the formulation consists of 30-50% by weight of (A), 25-70% by weight of (B), and 0-25% by weight of (C).

3. The reactive formulation of claim 1, wherein the formulation consists of 35-45% by weight of (A), 35-60% by weight of (B), and 5-20% by weight of (C).

4. The reactive formulation of claim 1, wherein the formulation consists of 38-42% by weight of (A), 40-50% by weight of (B), and 10-18% by weight of (C).

5. The reactive formulation of claim 1, wherein (A) comprises at least one substance selected from poly-1,4-diisopropylbenzene and compounds of formula:

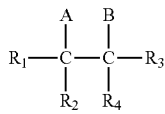

wherein:
$R_1$ and $R_3$ independently represent aromatic groups which may have one to five substituents independently selected from alkyl and halogen,
$R_2$ and $R_4$ independently represent hydrogen, aliphatic groups, and aromatic groups which may have one to five substituents independently selected from alkyl and halogen, and
A and B independently represent hydroxy, $C_1$-$C_4$ alkoxy or halogen.

6. The reactive formulation of claim 1, wherein (A) comprises a highly substituted ethane derivative, 2,3-dimethyl-2,3-diphenylbutane, poly-1,4-diisopropylbenzene, or any combination thereof.

7. The reactive formulation of claim 6, wherein the highly substituted ethane derivative is selected from 1,1,2,2-tetraphenylethanediol, benzopinacols which are substituted on a benzene nucleus, 1,2-di-tert-butylethanediol and derivatives thereof, and any combinations thereof.

8. The reactive formulation of claim 1, wherein (C) is present and comprises one or more substances selected from salts of polymers having acidic groups, phosphoric ester salts of high molecular weight copolymers having groups with pigment affinity, high molecular weight block copolymers having groups with pigment affinity, and any combinations thereof.

9. The reactive formulation of claim 1, wherein (A) has a particle size of from 1 μm to 300 μm.

10. The reactive formulation of claim 1, wherein (A) has a bimodal particle size distribution having maxima at about 10 μm and about 200 μm.

11. The reactive formulation of claim 1, wherein the formulation has been obtained by combining and grinding components (A), (B) and, optionally, (C) to obtain a dispersion in which (A) is present as particles having a size of from 5 nm to 500 μm.

12. A reactive formulation, wherein the formulation consists of
30-50% by weight of (A) at least one compound having at least one C—C-labile bond and comprising at least one substance selected from poly-1,4-diisopropylbenzene and compounds of formula:

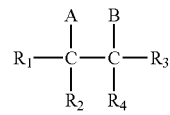

wherein:
$R_1$ and $R_3$ independently represent aromatic groups which may have one to five substituents independently selected from alkyl and halogen,
$R_2$ and $R_4$ independently represent hydrogen, aliphatic groups, and aromatic groups which may have one to five substituents independently selected from alkyl and halogen, and
A and B independently represent hydroxy, $C_1$-$C_4$ alkoxy or halogen;
25-70% by weight of (B) a solvent or solvent mixture in which (A) is not soluble and which comprises one or more solvents selected from aromatics-containing distillation cuts, aromatics-free hydrocarbyl mixtures, esters, ethers, styrene, vinyltoluene, butyl acrylate, butyl methacrylate, and combinations thereof, and
0-25% by weight of (C) one or more dispersants for (A),
(A) being present in (B) as a dispersed solid having a particle size of from 5 nm to 500 μm.

13. The reactive formulation of claim 12, wherein the formulation consists of 35-45% by weight of (A), 35-60% by weight of (B), and 5-20% by weight of (C).

14. The reactive formulation of claim 13, wherein (A) comprises a highly substituted ethane derivative, 2,3-dimethyl-2,3-diphenylbutane, poly-1,4-diisopropylbenzene, or any combination thereof.

15. The reactive formulation of claim 14, wherein (C) comprises one or more substances selected from salts of polymers having acidic groups, phosphoric ester salts of high molecular weight copolymers having groups with pigment affinity, high molecular weight block copolymers having groups with pigment affinity, and combinations thereof.

16. The reactive formulation of claim 13, wherein (A) has a particle size of from 1 μm to 300 μm.

17. The reactive formulation of claim 16, wherein (A) has a bimodal particle size distribution having maxima at about 10 μm and about 200 μm.

18. A process for preparing the reactive formulation of claim 1, wherein the process comprises combining and grinding components (A), (B) and, optionally, (C) to obtain a dispersion in which (A) is present as particles having a size of from 5 nm to 500 μm.

19. A polymerizable composition, wherein the composition comprises the reactive formulation of claim 1 and at least one polymerizable or curable substance.

20. The polymerizable composition of claim 19, wherein the composition is at least one of a varnish, an impregnating resin, or a casting resin.

* * * * *